United States Patent
MacNeil

(12) 
(10) Patent No.: US 6,318,612 B1
(45) Date of Patent: Nov. 20, 2001

(54) DEVICE FOR SECURING ITEMS TO A VEHICLE

(76) Inventor: David F. MacNeil, 215 E. First St., Hinsdale, IL (US) 60521

( * ) Notice: Subject to any disclaimer, the term of this patent is extended or adjusted under 35 U.S.C. 154(b) by 0 days.

(21) Appl. No.: 09/494,677

(22) Filed: Jan. 31, 2000

(51) Int. Cl.[7] .................................................... B60R 7/00
(52) U.S. Cl. ....................... 224/572; 224/330; 224/568; 224/901.4; 24/68 CD; 24/182; 24/306
(58) Field of Search .................................. 224/329, 330, 224/568, 563, 572, 901.4, 901.8; 24/68 CD, 69 CT, 182, 265 CD, 300, 301, 302, 306

(56) References Cited

U.S. PATENT DOCUMENTS

| | | |
|---|---|---|
| 3,618,608 | 11/1971 | Brink . |
| 3,994,048 | 11/1976 | Rosenthal . |
| 4,728,553 | 3/1988 | Daniels . |
| 4,759,963 | 7/1988 | Uso, Jr. et al. . |
| 5,104,076 | 4/1992 | Goodall, Jr. . |
| 5,174,483 | 12/1992 | Moore, IV et al. . |
| 5,289,619 | 3/1994 | Pileggi . |
| 5,433,359 | 7/1995 | Flowers . |
| 5,693,401 | 12/1997 | Sommers et al. . |
| 5,746,364 | * 5/1998 | Strengrim .............................. 224/572 |
| 5,758,808 | 6/1998 | Epps et al. . |
| 5,920,964 | * 7/1999 | Malzahn ................................. 24/182 |
| 5,947,354 | * 9/1999 | Williams .............................. 224/318 |
| 6,032,916 | * 3/2000 | Holliday ............................... 248/505 |
| 6,145,715 | * 11/2000 | Slonim ............................... 224/148.3 |

\* cited by examiner

*Primary Examiner*—Stephen K. Cronin
(74) *Attorney, Agent, or Firm*—Piper Marbury Rudnick & Wolfe

(57) ABSTRACT

A device for fastening an item to a vehicle comprising a strap having a first end, a middle portion, and a second end, and a cross-piece comprising a first end, a middle portion, and a second end. The middle portion of a the cross-piece is attached to the second end of the scrap. The first and second ends of the cross-piece include hook and loop portions respectively, for fastening one end of the cross-piece to the other. When in use, the second of the scrap is wrapped around a portion of a vehicle. Fastening components such as male and female buckle portions are used to secure the item to the vehicle. Excess material on the second end of the strap is rolled upon itself, leaving the first and second ends of the cross-piece exposed. The first and second ends of the cross-piece are then fastened to each other around at least a portion of the role material leaving no excess material exposed to when the vehicle is in motion.

9 Claims, 5 Drawing Sheets

DEVICE FOR SECURING ITEMS TO A VEHICLE

TECHNICAL FIELD

This invention relates generally to fastening devices. More particularly, this invention relates to a fastening device for attaching an item to a vehicle.

BACKGROUND OF THE INVENTION

When individuals travel from one location to another by automobile or other vehicle, there is often a need for additional cargo space that cannot be found inside the vehicle. A standard solution to this problem has been a car-top carrier that fits on top of the vehicle and is capable of storing items of various sizes. While these carriers are effective at holding cargo, it is important that the carriers are secured tightly to the top of the vehicle. If the carrier is not secured tightly, the carrier could become loose and either damage the top portion of the vehicle or fall off the vehicle entirely. Such carriers must therefore be tied down to the vehicle in some manner. Some carriers are made of cloth or other pliable material, are collapsible when not in use, and are tied to the vehicle using buckles and straps. Certain carriers use bolts, brackets and the like; these carriers tend to be hand-shelled and, through use of various attachment hardware, are customized to fit to a particular vehicle model. A standard practice for tying down such carriers is to use a length of belting that is stitched to the car-top carrier and run through a railing on the top of the vehicle. The user then buckles the strap to itself and cinches it tight. Although this system is reasonably effective, the free strap end encounters high winds resulting from the vehicle's motion, for example, while traveling over a highway. This causes the free end to flap about, which may cause the buckle to loosen with potentially catastrophic results. The flapping of the free strap end in the wind causes an audible noise which can be heard inside the vehicle. The flapping tendency can also result in chipping or scuffing of the vehicle's exterior surface and eventual fraying and unraveling of the strap.

Additionally, there are other items that are commonly placed on the top of a vehicle that must be securely fastened. These can include sporting goods such as bicycles, kayaks, or snow skis, and can also include larger items such as indoor or outdoor furniture. In each of these cases, it is very important that the items remain securely fastened to the vehicle and that there is no strap material that is left to flap about in the wind. Otherwise the strap could become worn over time, the vehicle's drivers and passengers may be irritated by the noise created by the flapping and the strap could become damaged, along with the top of the vehicle and the items being transported.

Therefore there is a need for a fastening strap that will securely hold items of various sizes to a portion of a moving vehicle and which will be secured against the vehicle and will prevent excess strap material from flapping about while the vehicle is in motion.

SUMMARY OF THE INVENTION

The present invention provides for a thin strap that is terminated with a cross-piece. In one embodiment of the invention, the cross-piece is fixedly attached to the strap. In an alternative embodiment, the cross-piece is removably connected to the strap, in which case the two pieces may be connected to each other by Velcro™ hook and loop elements or some other means. The ends of the cross-piece include correspondingly mating Velcro™ hook and loop elements. The first end of the strap is either fixedly or removably attached to the item to be secured to the vehicle. The second end of the strap is wrapped around a portion of the vehicle, such as a railing, and back over itself in the form of a bight. Any excess strap material is rolled up upon itself, forming a cylindrical roll. During the rolling of the strap, the cross-pieces remain exposed on both sides of the roll. The cross-pieces are then wrapped around a portion of the roll and a portion of the strap, and are fastened together via the Velcro™ elements. This arrangement allows a minimum number of portions of the strap to be exposed to the elements, reducing the risk of any strap portions becoming loosened when the vehicle is in motion and eliminating any unnecessary flapping of excess portions of the device.

In the preferred embodiment of the invention, the strap is attached to an item, such as a car-top carrier, at some point between the first end and the second end of the strap. The strap includes corresponding male and female complimentary fasteners such as a plastic buckle, with either the male or female component located on the first end and the complementary component located between the second end of the strap and the location where the strap is connected to the carrier. After the second of the strap is wrapped around a vehicle portion, the male and female components are connected to each other. The second end of the strap is then rolled upon itself and the cross-pieces are folded over the resulting cylindrical roll.

In yet another embodiment of the invention, two straps are used to secure the item. Both straps are either removably or fixedly connected to the item to be secured. Complimentary fasteners are included on both straps for connecting each strap to each other. The first strap is wrapped around the vehicle portion as in the preferred embodiment. The male and female portions are then connected to each other, and the remaining exposed strap is rolled upon itself before the cross-piece is folded over the resulting roll.

These and other objects, advantages, and features of the invention together with the organization and manner of operation thereof will become apparent from the following detailed description when taken in conjunction with the accompanying drawings wherein like elements have like characters throughout the drawings described below.

BRIEF DESCRIPTION OF THE DRAWINGS

FIG. 1b is a side view of the buckle shown in FIG. 1a.

DETAILED DESCRIPTION OF THE INVENTION

Figure 1:
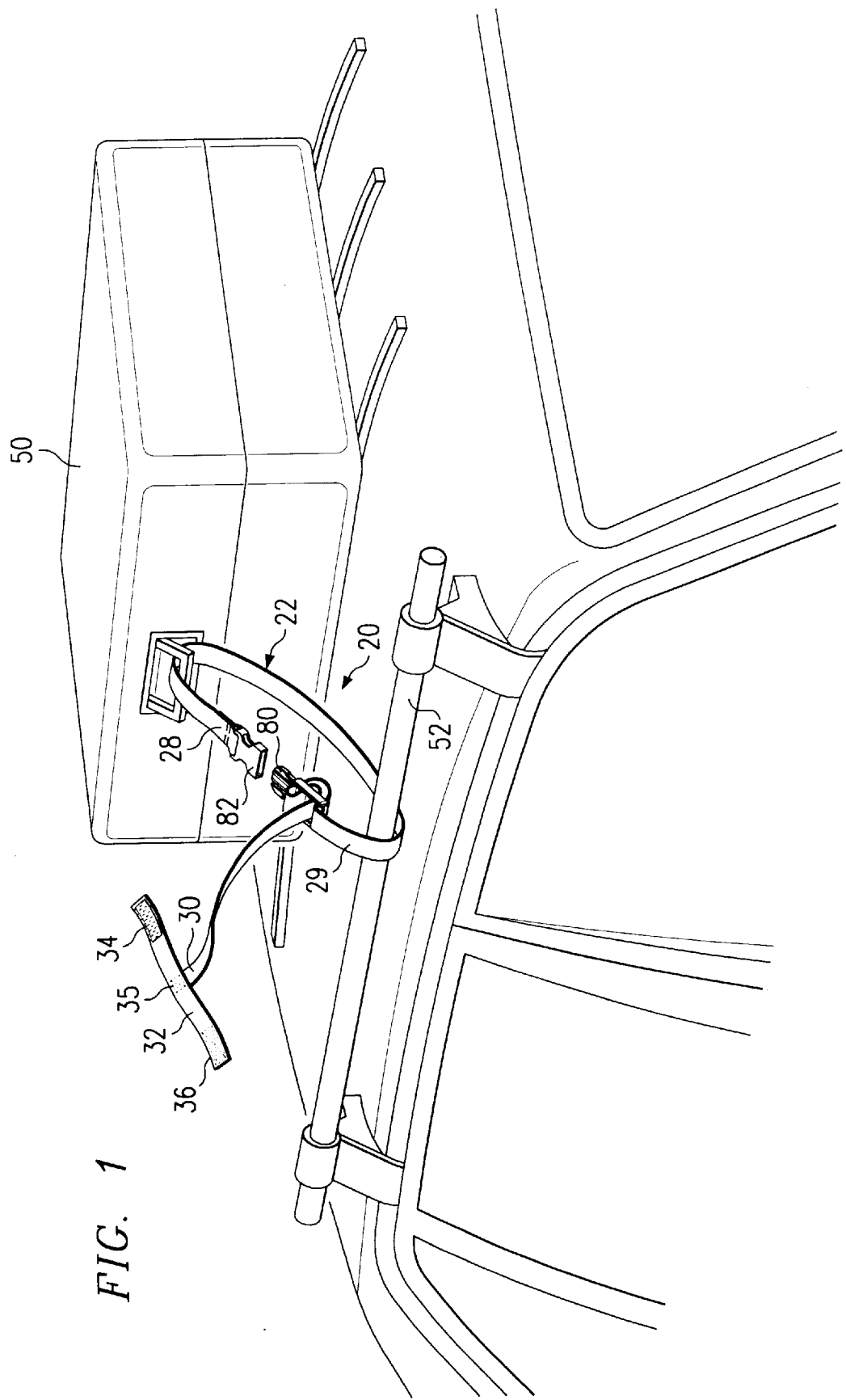
FIG. 1 is an isometric view of the fastening device when connected to the item to be mounted on a vehicle according to the preferred embodiment of the invention.
Figure 1A:
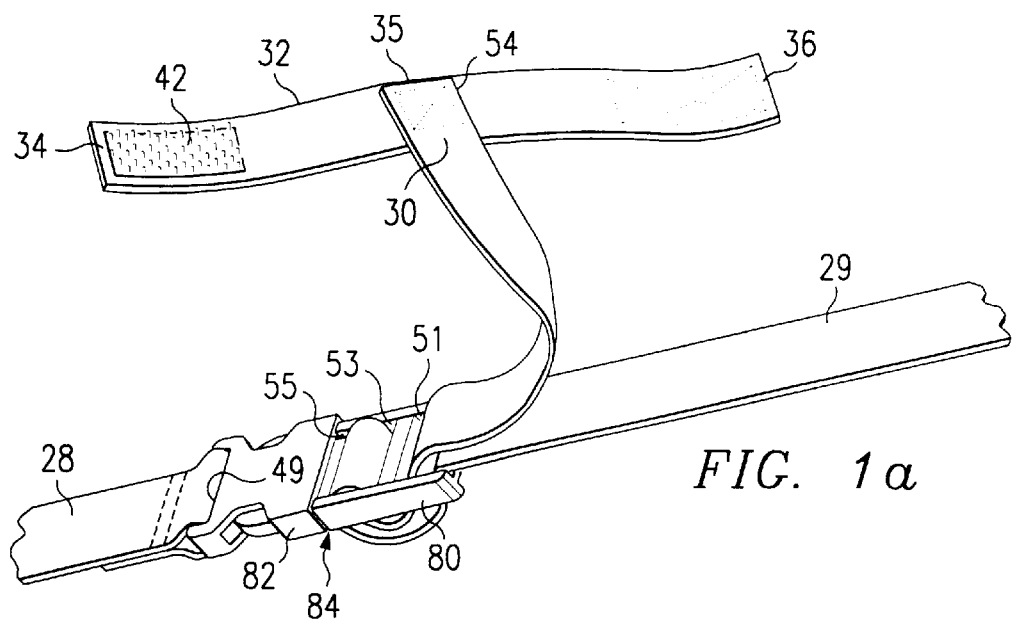
FIG. 1a is detail of the strap and of a portion of a buckle used according to the invention when the male and female components of the buckle are connected to each other.
Figures 2, 3:
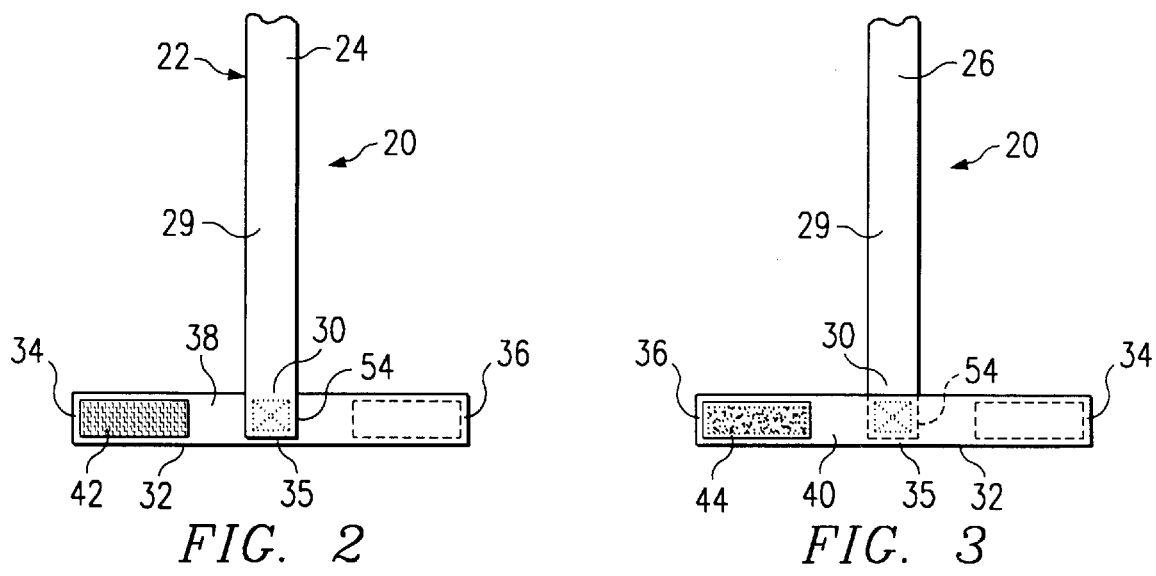
FIG. 2 is a sectional top view of the end of the strap and cross-piece when in an unrolled position.
FIG. 3 is a sectional bottom view of the end of the strap and cross-piece when in an unrolled position.

As shown in FIGS. 1–3, a fastening device shown generally at 20 includes a strap 22 having a first side 24 and a second side 26. The strap 22 also has a first end 28, a middle portion 29, and a second end 30. A cross-piece 32 is connected to the second end 30 of the strap 22. The cross-piece 32 has a first side 38 and a second side 40. Additionally, the cross-piece 32 has a first end 34, a middle portion 35, and a second end 36. Preferably, all straps used in the invention have a width which is several times their thickness so that the straps have a flat aspect with opposed top and bottom major surfaces. As better illustrated in FIG. 1a, a major surface of the strap 22 at the end thereof is affixed as by stitching to a major surface of the crosspiece at a middle portion thereof. The strap 28 and the cross-piece 32 may be fixedly connected to one another by some other method than stitching, such as by gluing or heat-welding. Preferably, the second end 30 of the strap 22 is connected to the middle portion 35 of the cross-piece 32, although it is possible for there to be a small portion of the strap 22 extending beyond the cross-piece 32.

The cross-piece 32 includes complimentary fasteners on the first end 34 and second end 36 thereof. In the most preferred embodiment of the invention the complimentary fasteners comprise the hook and loop material commonly known as Velcro™. For example, the hook material 42 is located on the first side 38 of the cross-piece 32 and on the first end 34 thereof. The loop material 44 is placed on the second end and 36 conversely is located on the second side 40 of the cross-piece 32., Other complimentary fasteners, such as male and female snaps or a button and buttonhole, could also be used.

Figure 1B:
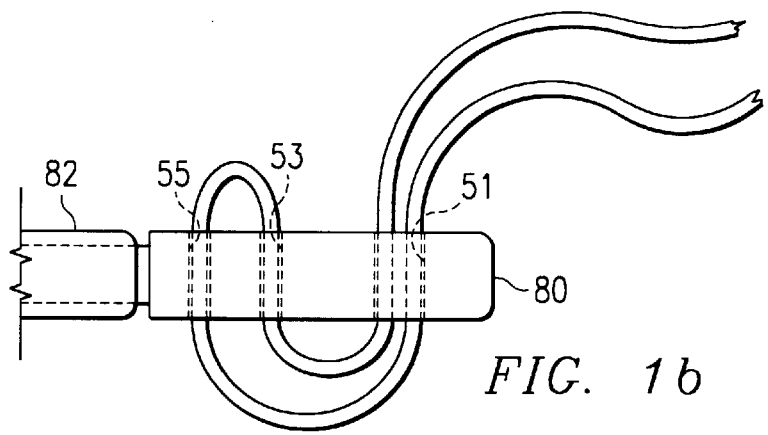
Figure 4:
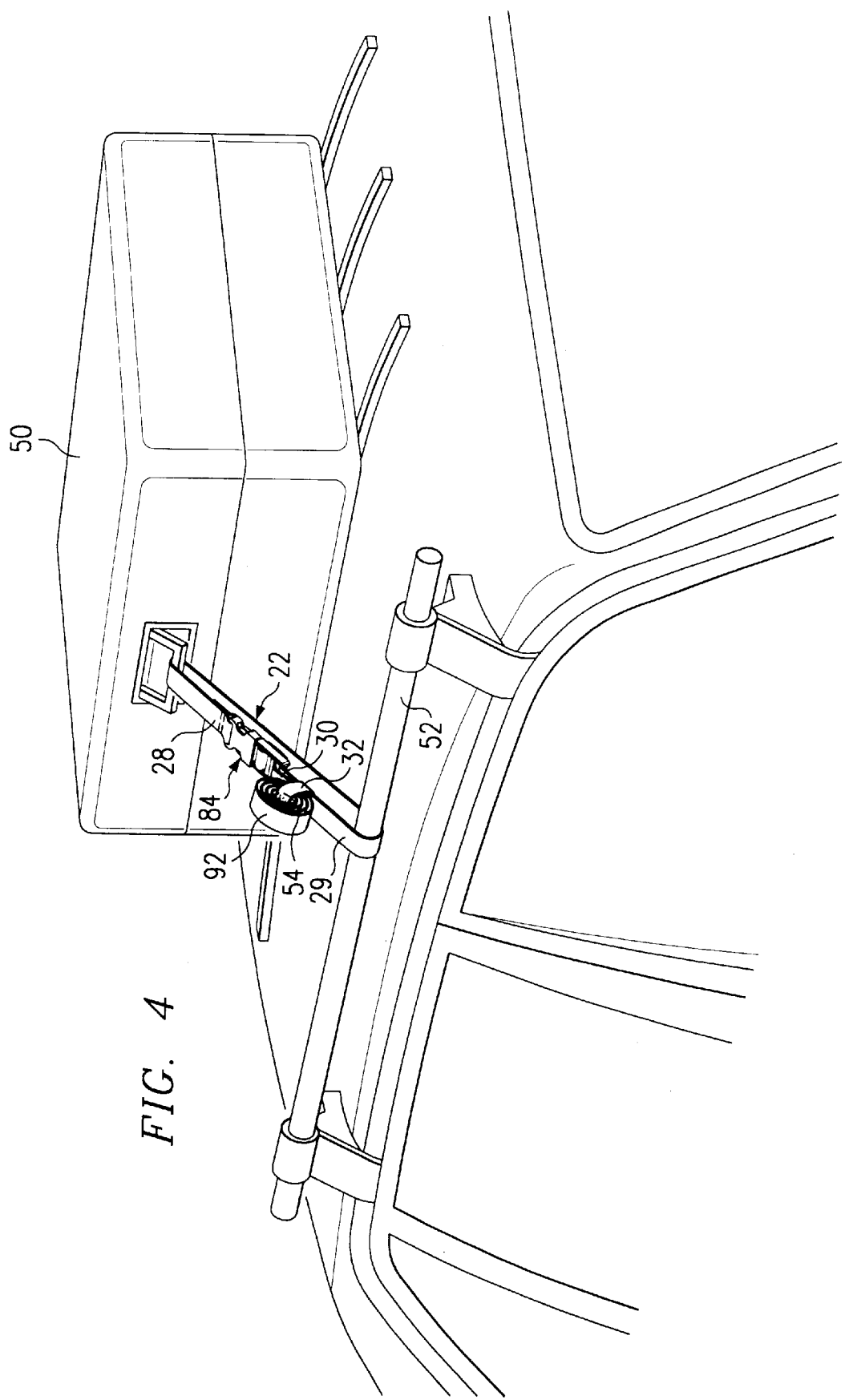
FIG. 4 is an isometric view of the fastening device in a rolled position while in use according to the preferred embodiment of the invention.

According to the preferred embodiment of the invention as shown in FIGS. 1, 1a and 1b, the fastening device 20 also comprises additional fastening components for connecting the first end 28 of the strap 22 to the middle portion 29 of the strap 22 in order to secure the portions. Most preferably, the fastening means include corresponding male and female components 80 and 82 of a buckle, shown as 84 in FIG. 4. The buckle 84 is preferably the primary device for securing the item 50 to the vehicle portion 52. Although a plastic buckle 84 is preferred in the invention for its relative ease of manufacture and use, other fastening means such as rings, clips, or other devices that are well-known in the art could also be used. The female component 82 is preferably fixedly attached to the first end 28 of the strap 22. In a preferred embodiment of the invention, this is accomplished by routing the first end 28 of the strap 22 through a slot 49 located in the female component 82 before securing the first end to the strap 22 via stitching or some other method. The male component 80 is adjustably connected to the middle portion 29 of the strap. This can be accomplished, as shown in FIG. 1a, by sliding the strap through and around slots 51, 53, and 55 of the male component 80. This permits the male component 80 to be moved for a better fit in the device 20. In order to ensure a secure fit, the male and female components of the buckle 80 are first snapped together, and the joined strap ends are cinched tight by pulling on the strap end. It is important to realize that the locations of the male and female components 80 and 82 could be easily reversed by having the female component located on the first end 28 of the strap 22 and the female component 82 threaded onto the middle portion 29 of the strap 22 without significantly affecting the functionality of the device 20.

In the preferred embodiment of the invention, both the strap 22 and the cross-piece 32 are made of nylon webbing, although other flexible materials could be used such as other woven fabrics, plastic or leather.

According to the preferred embodiment is as follows, one part of the middle portion 29 of strap 22 is connected to an item 50. Generally, the length of the first end 28 of the strap 22 will be substantially less than the distance from the item 50 to the vehicle portion 52 to which the item 50 will be secured. In a preferred embodiment of the invention, the item 50 is in the form of a car-top carrier, although other items are possible. In the case of a car-top carrier, the middle portion 29 can be fixedly attached to the item 50 in one of several manners that are well known in the art, such as stitching, heat bonding, gluing, riveting, or welding. Additionally, for both the car-top carrier and other items, the middle portion 29 can be connected to the item 50 such that it can be easily removed. For example, the middle portion 29 could be snap-fit onto the item 50 by means of a harness clip or some other device.

Once the strap 22 is attached to the item 50, the second end 30 of the strap 22 is wrapped once around a portion of the vehicle 52. This portion of the vehicle will commonly be a rail or a rack located on the top or side of the vehicle, although other fixtures such as a door handle may be adequate. The second end 30 is subsequently brought back over the middle portion 29 of the strap 22. The user slides the male component 80 of the buckle 82 into the desired position along middle portion 29 of the strap 22, and the strap 22 is pulled to cinch the male component 80 tight, fixing its relative position. The male and female components 80 and 82 of the buckle 84 are then connected to each other, forming a secure fit. Preferably, the two buckle components 80 and 82 are oriented to permit as little movement of the strap 22 and item 50 as possible. To best assure such a tight fit, it is important that the male component 80 of the buckle be located on that part of the strap 22 that has been wrapped around the vehicle portion 52. The exact location of the male component 80 aft of the portion 52 has more flexibility.

Once the buckle 84 is secure, the user rolls the second end 30 of the strap 22 over itself several times, rolling up the excess material. Optimally, the second end 30 of the strap 22 is rolled all the way up the buckle 84, leaving no excess material exposed. During this rolling action of the second end 30 of the strap 22, the first and second ends 34 and 36 of the cross-piece 32 should remain in an unfolded position. Once the rolling action of the second end 30 of the strap 22 is complete, the first and second ends 34 and 36 of the cross-piece 32 will stick out from the roll 54 like wings. The first and second ends 34 and 36 of the cross-piece 32 are then wrapped once around the side of the roll 54 that includes the middle portion 29 of the strap 22 that is taut between the item 50 and the vehicle portion 52. The first end 34 of the cross-piece 32 is then placed firmly against the second side 26 of the strap 22. Subsequently, the second end 36 of the cross-piece 32 is tightly placed directly upon the hook portions 42 that are located on the first end 34 of the cross-piece 32. As the hook portions 42 and the loop portions 44 come into contact with one another, the action of the Velcro™ combination causes the two ends 34 and 36 of the cross-piece 32 to be fixedly connected to each other. The resulting operation leaves no spare pieces of the fastening device 20 exposed to high winds when the vehicle is in motion. In this case it is important that the first and second ends 34 and 36 of the cross-piece 32 extend far enough away from the strap 22 so that they are capable of reaching each other when wrapped around the roll 54. As a general formula for the length, each end of the cross-piece 32 must extend away from the center of the strap 22 by more than one-half of the strap width, plus one thickness of the strap for each time the strap 22 is rolled about itself in order for the two ends 34 and 36 to meet. Since in the preferred embodiment the strap 22 is adjustable so that it can be secured to an anchor point which is close to the item 50 or one which is far away, the roll 54 will be of various sizes. In some instances, the loose, post-buckle end strap 30 will be relatively short, forming a small roll 54. In other instances, the strap end 30 will be relatively long, forming a large roll 54. The length of the crosspiece 32 should be specified to accommodate a relatively large roll 54. The variability of the roll 54 also means that a variable length of the crosspiece 32 will be used in traversing the radius of the roll 54. Ends 34 and 36 (FIGS. 2 and 3) will therefore overlap to varying degrees. It is therefore preferred that the crosspiece 32 employ fastening material which can fasten to each other at any of several locations, and hook and loop material meets this purpose.

Figure 5:
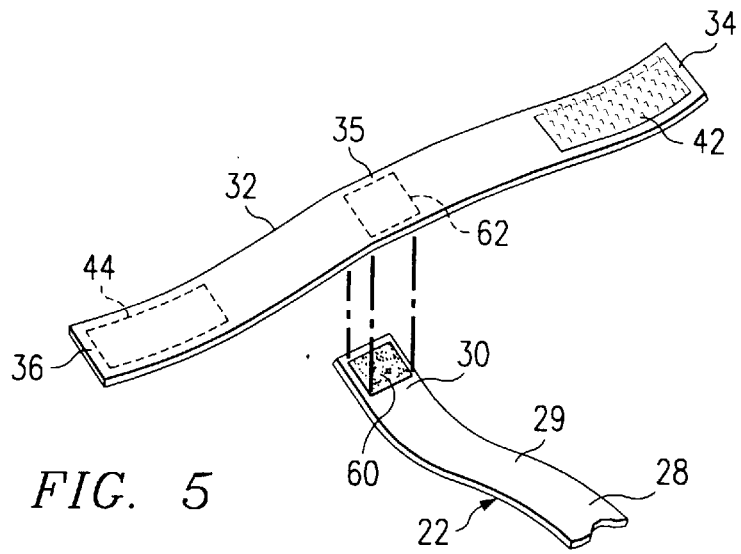
FIG. 5 is an isometric view of an alternative embodiment of the invention showing only the strap and cross-piece, wherein the strap and the cross-piece are removably connected to each other.
Figure 6:
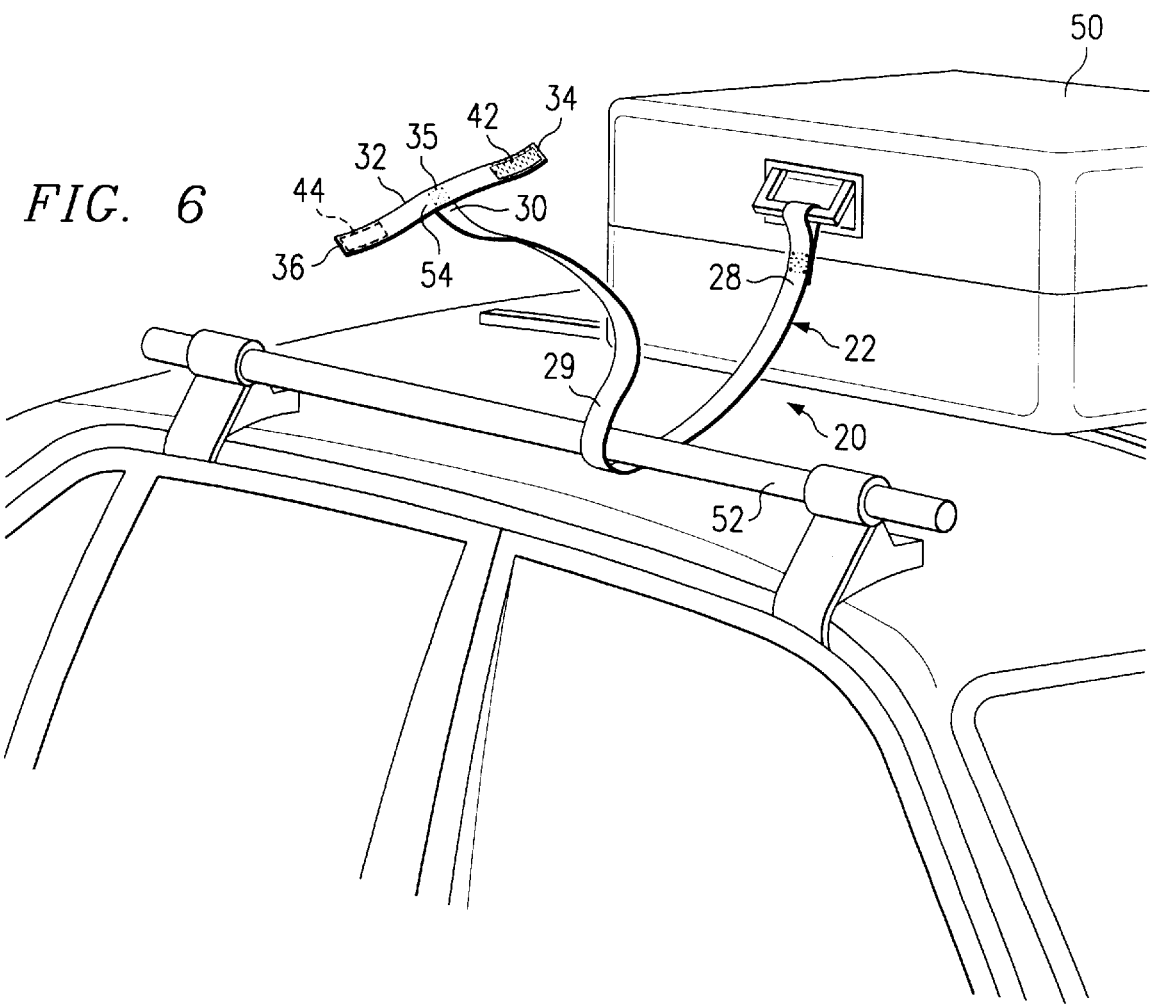
FIG. 6 is an isometric view of an alternate embodiment of the invention, wherein the strap does not include fastening means for further connecting the first end of the strap to the second end.
Figure 7:
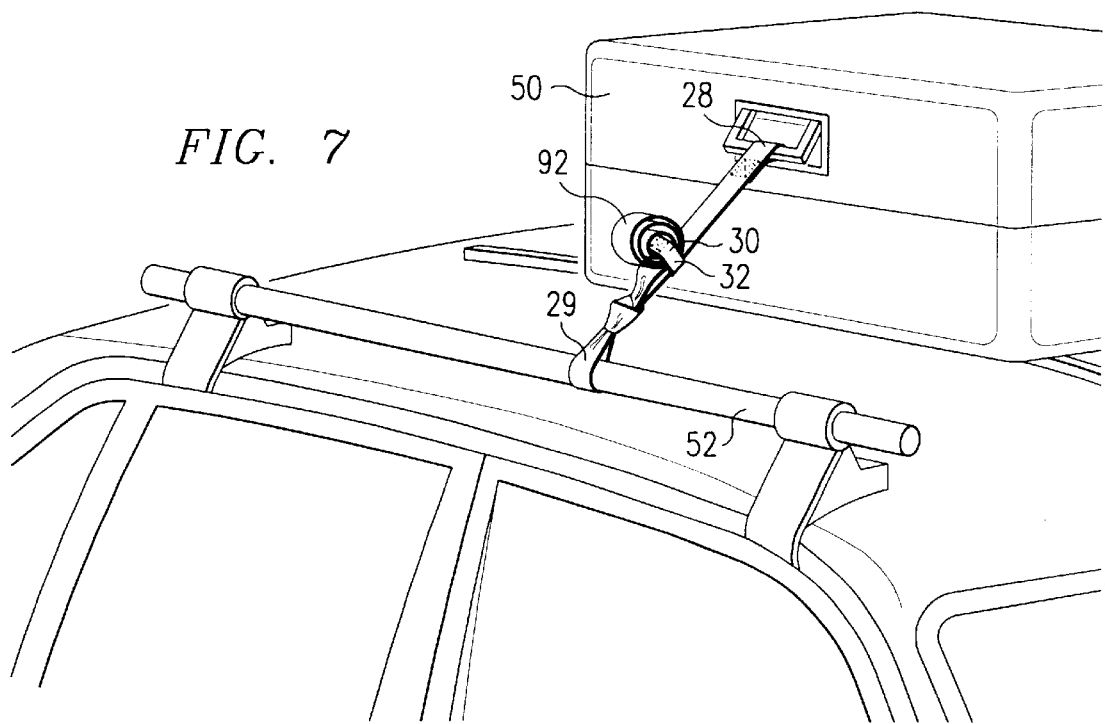
FIG. 7 is an isometric view of the alternate embodiment shown in FIG. 6, wherein the device is shown in the rolled and secured position.

As described earlier, the cross-piece 32 is preferably fixedly attached to the second end 30 of the strap 22. As shown in FIG. 5, however, it is also possible for the strap 22 and cross-piece to be removably connected to one another. In this embodiment, the second end 30 of the strap 22 and middle portion 39 of the cross-piece 32 include corresponding fastening means. As shown in FIGS. 6–7, it is also possible for the fastening device 20 to not include any buckle for further restraining the motion of the strap 22. Although the buckle 84 is absent, the device 20 operates in a similar manner. In the embodiment shown in FIG. 6, the first end 28 of the strap 22 is either fixedly or removably connected to the item 50. The second end 30 of the strap 22 is routed through an opening at a vehicle portion 52 and pulled back over the strap 22. In order to adequately secure the item 50 to the vehicle portion 52, the user would then use a taut line hitch or otherwise wrap and knot the second end 30 of the strap 22 around the middle portion 29 of the strap 22. Excess strap material is then rolled upon itself as before. The two exposed ends 34 and 36 of the cross-piece 32 are then wrapped around the roll 92 and the connected to each other via the Velcro™ portions or other fastening means.

Figure 8:
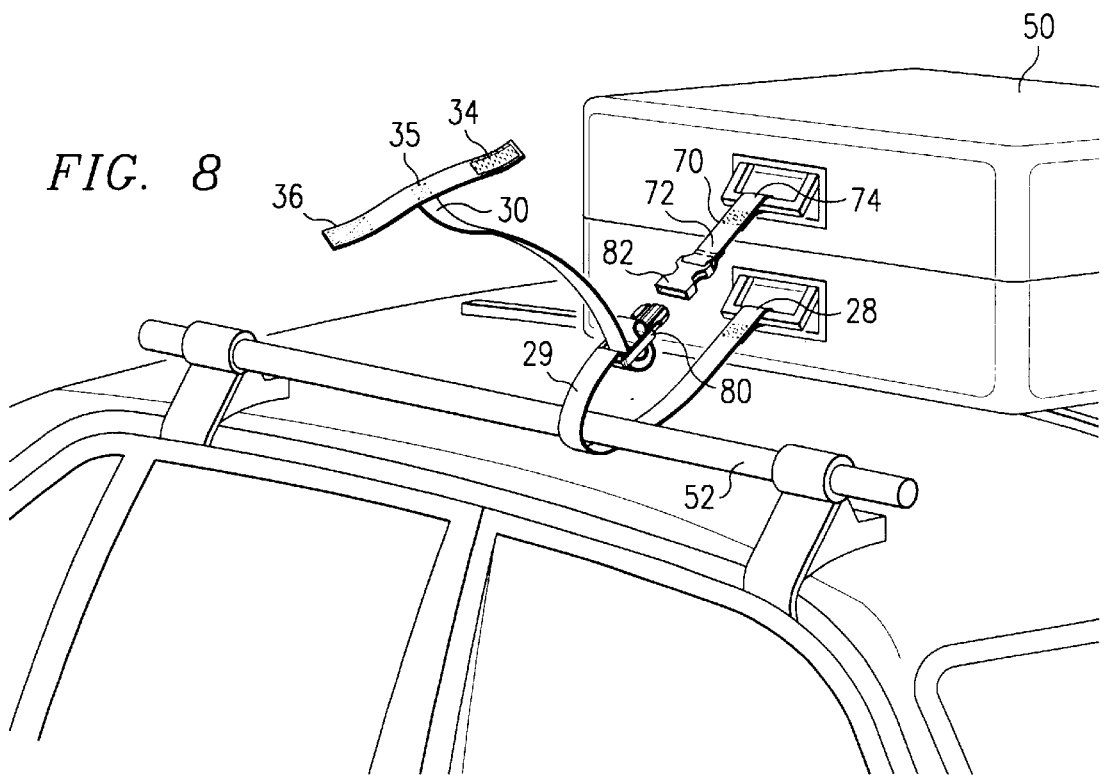
FIG. 8 is a side view of an alternate embodiment of the invention, wherein a second strap is used for securing the first strap.

In yet another embodiment as shown in FIG. 8, two straps could be used to achieve substantially the same result as the arrangement shown in the preferred embodiment. In this embodiment, the male component 80 of the buckle 84 is attached to a first end 72 of a second strap 70. In this embodiment, the second end 74 of the second strap 70 is either fixedly or removably attached to the item 50 in a location relatively close to the point where the first end 28 of the first strap 22 is connected to the item 50. After the first strap 22 is wrapped around the vehicle portion 52, the male and female components 80 and 82 of the buckle 84 are connected to each other as is explained for the preferred embodiment. The excess material of the strap 22 is then rolled upon itself, and the two ends 34 and 36 of the cross-piece 32 are used to secure the roll 92.

While preferred embodiments of the invention have been shown and described, it is understood that changes and modifications can be made to the invention without departing from the invention's broader aspects. For example, it is possible for the cross-piece of the fastening device to be located not at the second end of the strap but instead slightly closer to the middle portion of it. In the same spirit, the strap does not have to be connected to the cross-piece at the cross-piece's exact center position. Instead the strap can reach the cross-piece closer to one end, and it is even possible for the strap to attach at either end of the cross-piece. Wherever hook and loop portions are specifically mentioned as being on a particular end of a strap or cross-piece, it should be understood that the positioning of each can always be reversed. Similarly, the male and female components of the buckle can also be reversed relative to their positions on the strap. Furthermore, other fastening mechanisms besides Velcro™ or buckles can also be used in order to achieve the same result. Additionally, the fastening device can be used to secure objects to a variety of vehicles, such as cars, trucks, vans, motorcycles, bicycles, or boats, and is generally applicable to any object traveling through a fluid such as air at more than moderate speeds, where a second object is to be releasably attached to the first. Finally, the fastening device could also be used to attach two non-vehicular items to each other if the need arises. Thus, it is apparent that alternate embodiment are available to those skilled in the relevant art, therefore the present invention is not limited to the described and illustrated embodiments, but only to the scope and spirit of the appended claims.

I claim:

1. An item adapted to be removably affixed to a vehicle, comprising:

a body;

a first strap portion having a first end affixed to the body and a second end opposed to the first end and terminating in a first buckle portion;

a second strap portion having a first end affixed to the body and a second end remote from the first end;

a second buckle portion having at least one orifice for receiving the second end of the second strap portion therethrough, the second end of the second strap portion being passed through the orifice, the second buckle portion adapted to fasten to the first buckle portion; and a crosspiece affixed to the second end of the second strap portion, the crosspiece having first and second opposed ends, a first fastener affixed to the first end of the cross-piece, a second fastener adapted to be fastened to the first fastener and affixed to the second end of the cross-piece, the cross-piece having a sufficient length such that when an excess portion of the second strap portion is rolled up upon itself, the cross-piece may be wrapped around the rolled-up excess portion and the first and second fasteners may be fastened together.

2. The device of claim 1, wherein the first and second strap portions are separate from each other.

3. The device of claim 1 wherein the strap portions are made of a woven fabric.

4. The device of claim 1 wherein the first and second opposed ends of the crosspiece project far enough away from the strap such that the first and second opposed ends of the crosspiece can be folded over each other.

5. The device of claim 1 wherein the body comprises a vehicle-top carrier.

6. The device of claim 5 wherein the first and second strap portions are integrally connected to each other.

7. The device of claim 1 wherein the first and second opposed ends of the crosspiece are formed together as one piece which is fixedly connected to the strap.

8. The device of claim 7 further comprising the steps of:

mating strap-attached male and female portions of a buckle to each other; and prior to the step of rolling, cinching a free end of the strap tight by pulling the free end downwards.

9. The device of claim 8 further comprising the step of attaching the strap to the first item.

* * * * *